April 23, 1963    J. K. ROSE    3,087,014
CABINET WITH LIGHT SHIELD
Filed July 1, 1957    6 Sheets-Sheet 2
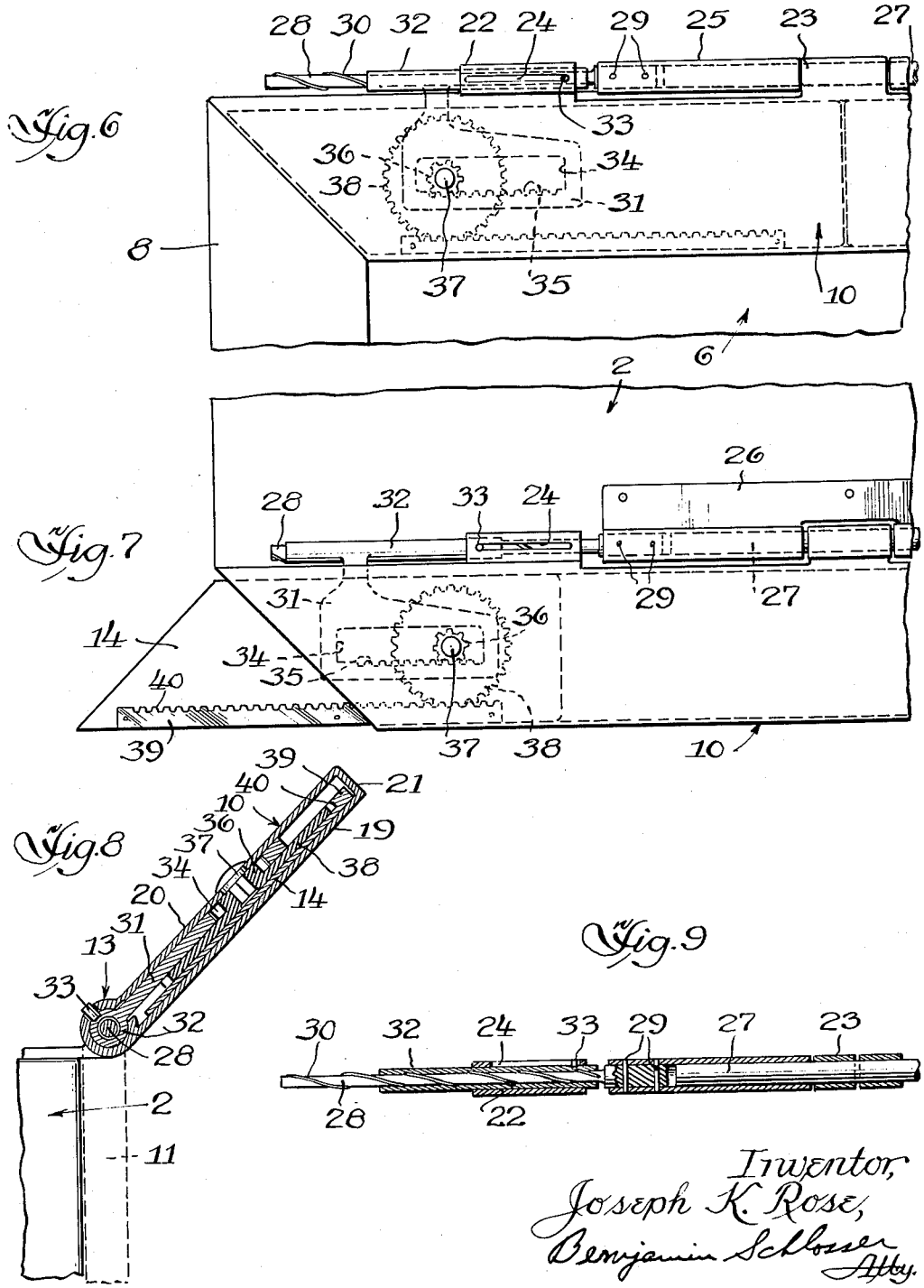

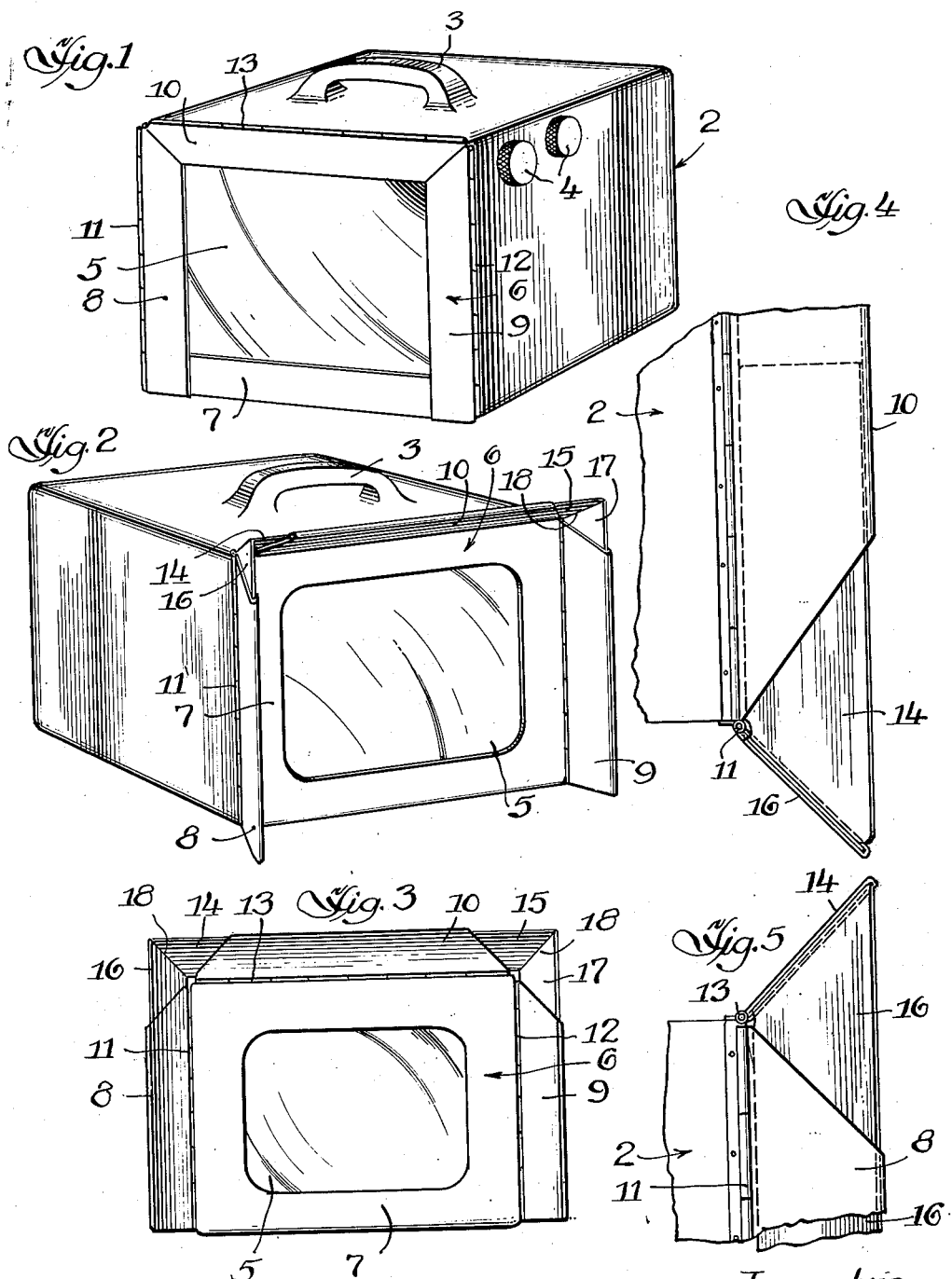

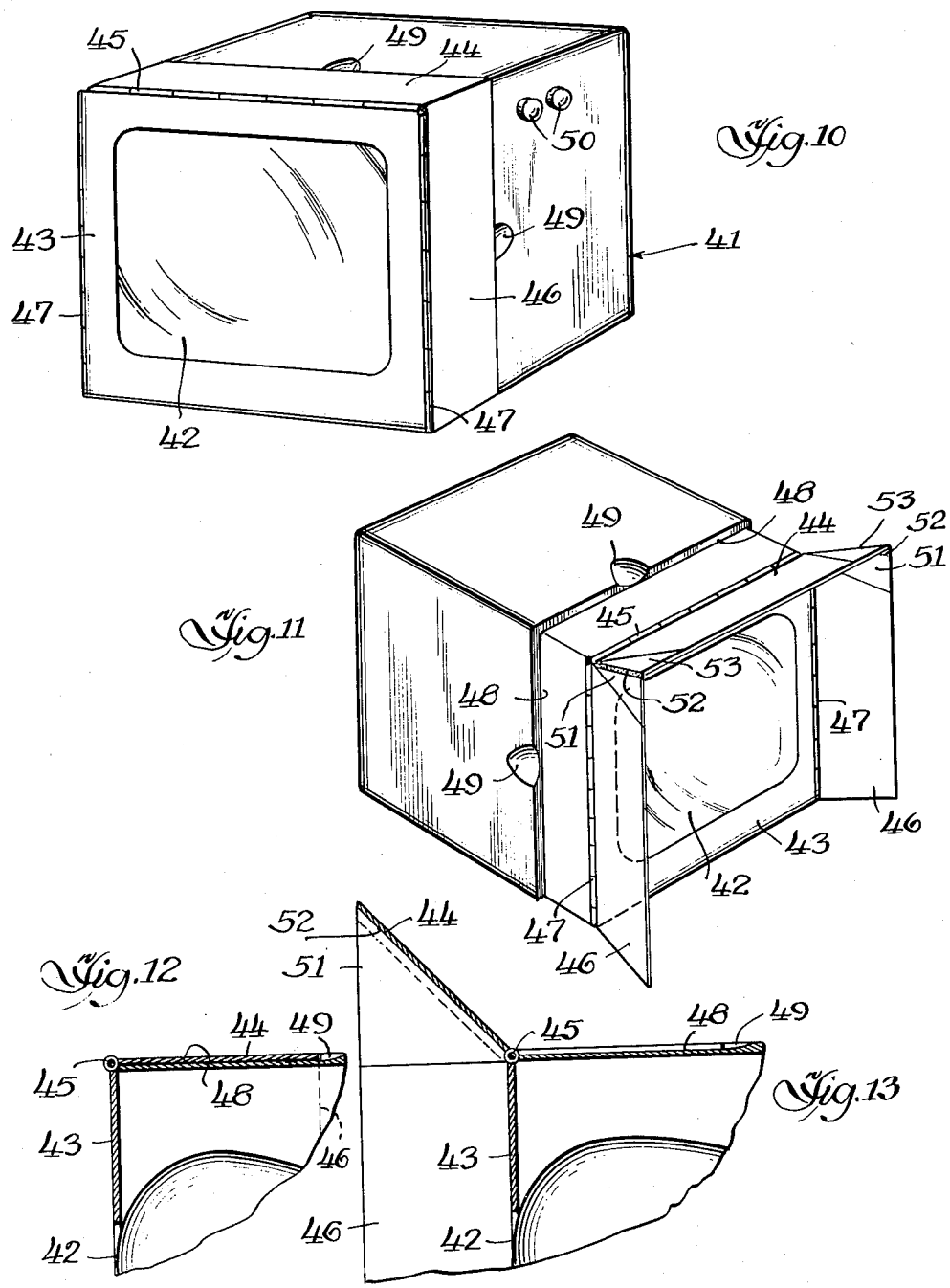

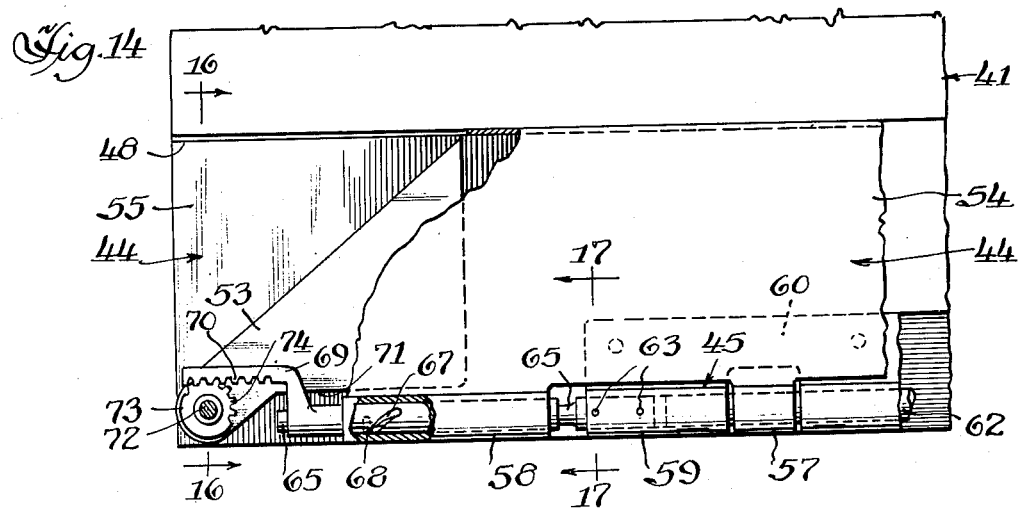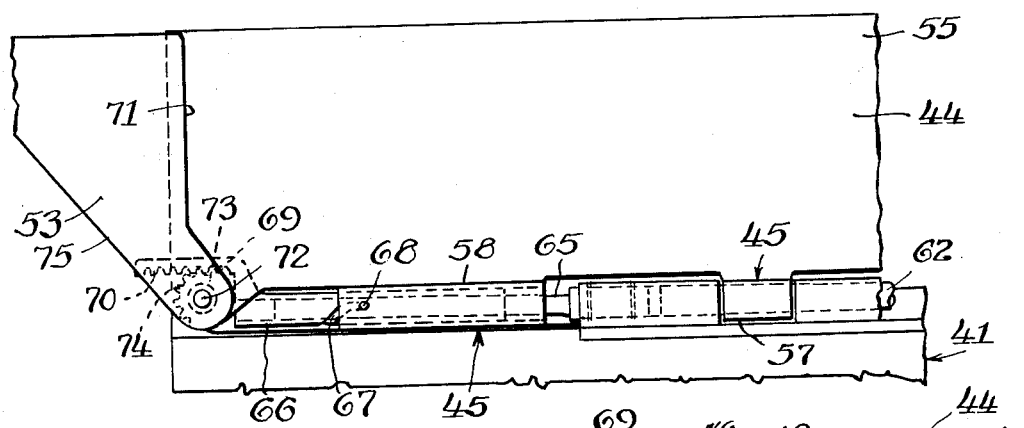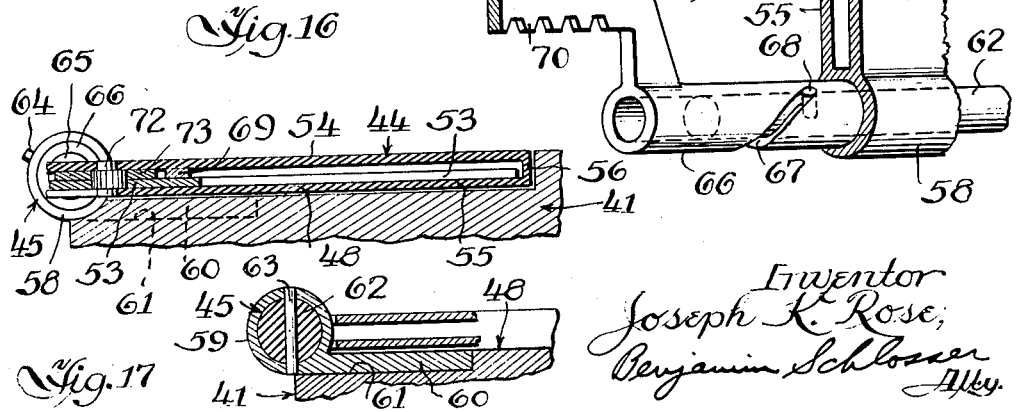

April 23, 1963
J. K. ROSE
3,087,014
CABINET WITH LIGHT SHIELD
Filed July 1, 1957
6 Sheets-Sheet 5
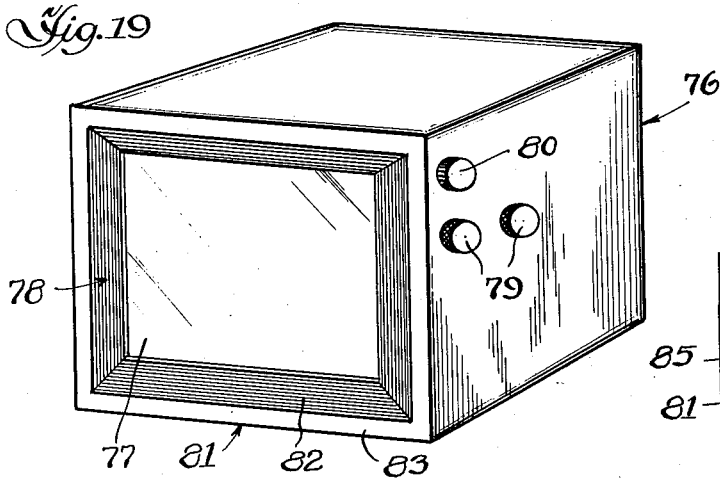
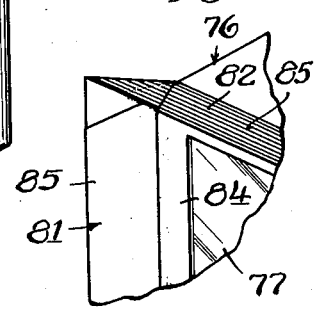
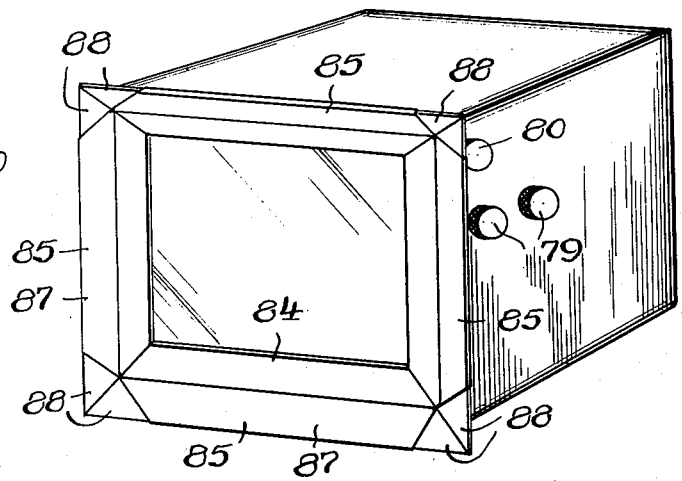
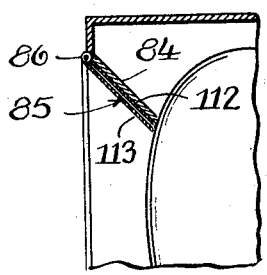
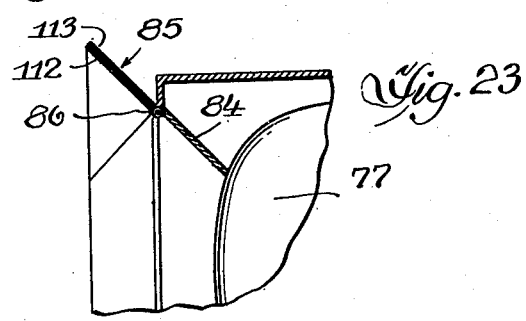
Inventor,
Joseph K. Rose
Benjamin Schlosser
Atty.

United States Patent Office 3,087,014
Patented Apr. 23, 1963

3,087,014
CABINET WITH LIGHT SHIELD
Joseph K. Rose, 1116 Linden Ave., Highland Park, Ill.
Filed July 1, 1957, Ser. No. 668,945
22 Claims. (Cl. 178—7.82)

The present invention relates to a cabinet adapted for housing a television receiver or other form of viewing apparatus, such as, for example, an oscilloscope, slide viewer, radar screen, or range finder, and is particularly concerned with means for increasing the eye comfort of viewers of images exhibited by such devices.

Although the features of the various constructions described are advantageous in connection with several different types of viewing devices, the structure will be described with particular reference to a television receiver.

In the constructions described in this application, portions of the mask or portions of the cabinet open out into a light shield for the viewing screen. The mask may be metal, wood, or plastic, and may be a separate member or may be integral with the front of the cabinet.

In some television receivers, the mask, or area surrounding the viewing screen, is purposely darkened to enhance the beauty of the cabinet. This results in a dark area surrounding the relatively bright viewing screen which will cause eye strain unless proper compensation is made therefor. The large difference in brightness between the image on the viewing screen and the area of the front of the cabinet surrounding and immediately adjacent to the viewing screen is a very common cause of eye strain.

In accordance with my present invention, the eye strain ordinarily incidental to prolonged television viewing is reduced considerably by increasing the diffuse reflection factor of the area contiguous to the edges of the image exhibiting member to reduce the brightness contrast.

The present invention contemplates the provision of a new and improved light shield which not only eliminates the detrimental effects of external light on the image exhibiting member, but also increases the diffuse reflection factor of the area contiguous to the image exhibiting member when it is extended into light shielding position. In this embodiment of the invention, portions of the mask or portions of the cabinet provide the light shield panels for eliminating the detrimental effects of both the sharp contrasts and the external light common to most television viewing. This is done by increasing the diffuse reflection factor of the surface areas of those parts exposed whten the light shield is moved out into light shielding position.

The light shield panels may be manually moved pivotally about their hinges to move them into light shielding or into closed position. The light shielding panels may be pivotally moved into light shielding or closed position by interconnected rods, one of which projects through a side wall of the cabinet, and which are driven, through suitable gearing, by the rod projecting through the side wall of the cabinet. The outer end of the rod which projects through a side wall of the cabinet is provided with a knob to facilitate rotation of the rod. The knob may be fixed to the end of the rod by a set screw, or in any other suitable manner.

The light shield panels may be manually moved into and out of light shielding position, or they may be moved by a motor or by any suitable mechanical means. The pivotal movement of the light shield panels into light shielding position automatically moves the auxiliary sections outwardly into light shielding position. Similarly, the pivotal movement of the light shield panels into closed position causes each of the auxiliary sections to be retracted into the housing formed by the walls of the panel to which it is attached.

In one embodiment of the invention, pivotal movement of the light shield panels causes the auxiliary sections to be extended into light shielding position by sliding the auxiliary sections outwardly from each panel. In another embodiment, the auxiliary sections are pivotally moved outwardly into light shielding position by the pivotal movement of the light shield panels.

It will be understood that the mechanisms for moving the auxiliary sections into and out of light shielding position are interchangeable. For example, in the embodiment having the light shield panels as part of the mask and shown with the mechanism for sliding the auxiliary sections into and out of light shielding position, the mechanism may be replaced by the mechanism shown in the embodiment in which the auxiliary sections are moved pivotally into and out of light shielding position. Similarly, in the embodiment utilizing panels held in recesses in the cabinet as light shield panels, the mechanism for pivotally moving the auxiliary sections into and out of light shielding position may be replaced by mechanism for sliding the auxiliary sections into and out of light shielding position.

The structure by means of which the above and other advantages are attained is described in the following specification, taken in conjunction with the accompanying drawings illustrating several preferred illustrative embodiments of the invention, in which:

FIG. 1 is a perspective view of a cabinet embodying the invention and showing a three-sided light shield in closed position;

FIG. 2 is a perspective view, similar to FIG. 1, with the light shield in open, or light shielding position;

FIG. 3 is a front elevational view, showing the light shield in open position;

FIG. 4 is a fragmentary top elevational view, with the light shield in open position;

FIG. 5 is a fragmentary side elevational view, with the light shield in open position;

FIG. 6 is a fragmentary front elevational view of the cabinet of FIG. 1, with the mechanism for sliding one of the auxiliary sections shown in dotted lines;

FIG. 7 is a fragmentary top plan view of the structure shown in FIG. 6, with the top light shield section in open position and the auxiliary section slid outwardly;

FIG. 8 is a fragmentary cross sectional view, showing the top light shield in open position;

FIG. 9 is a fragmentary longitudinal sectional view, showing the hinge for pivotally moving the top light shield and sliding the auxiliary section into light shielding position;

FIG. 10 is a perspective view of a different cabinet, showing another three-sided light shield in closed position;

FIG. 11 is a perspective view of the cabinet shown in FIG. 10, with the light shield in open, or light shielding position, and the auxiliary sections moved pivotally into open position;

FIG. 12 is a fragmentary sectional view of the cabinet of FIG. 10, showing the top light shield in closed position;

FIG. 13 is a fragmentary cross sectional view of the cabinet of FIG. 10, with the light shield in open position;

FIG. 14 is a fragmentary top plan view of the cabinet of FIG. 10 showing the light shield in closed position, with parts broken away to show the hinge structure and the mechanism for pivotally moving one of the auxiliary sections;

FIG. 15 is a fragmentary top plan view, similar to FIG. 14, showing the top light shield in open position, with one auxiliary section pivotally moved into open position;

FIG. 16 is a fragmentary cross sectional view, taken along the line 16—16 of FIG. 14;

FIG. 17 is a fragmentary cross sectional view, taken along the line 17—17 of FIG. 14;

FIG. 18 is a detail perspective view of the hinge structure of the cabinet shown in FIG. 10;

FIG. 19 is a perspective view of a cabinet with a four-sided light shield shown in closed position, and having a rod accessible from the side of the cabinet for pivotally moving the light shield panels into or out of light shielding position;

FIG. 20 is a perspective view, similar to FIG. 19, with the light shield in light shielding position;

FIG. 21 is a fragmentary perspective view of one corner of the cabinet of FIG. 19, with the light shield in light shielding position;

FIG. 22 is a fragmentary cross sectional view of the cabinet of FIG. 19, with the light shield in closed position;

FIG. 23 is a fragmentary cross sectional view, similar to FIG. 22, with the light shield in light shielding position;

Figure 24:
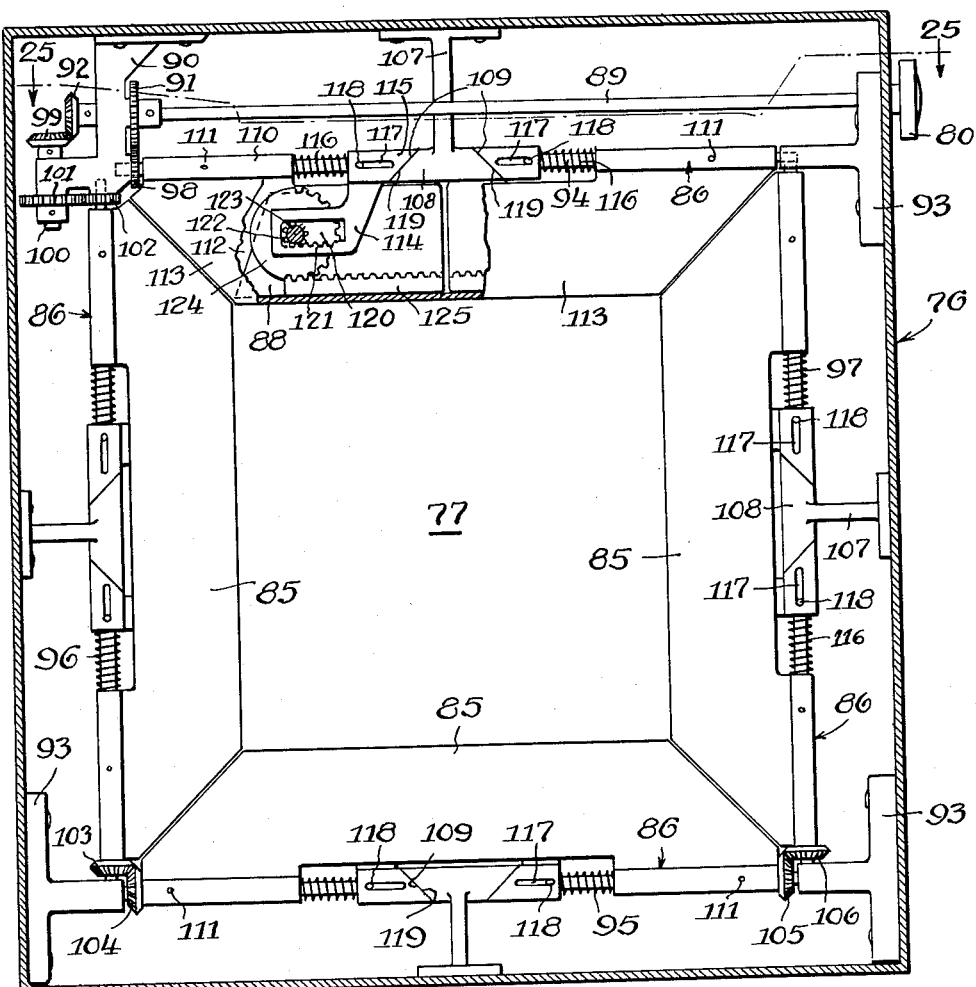
FIG. 24 is a front plan view of the mechanism for pivotally moving the light shield panels of the cabinet shown in FIG. 19, and their auxiliary sections, into and out of light shielding position.

In FIGS. 1 to 5 of the drawings, the reference numeral 2 indicates a television receiver cabinet which may be made of metal, wood, or plastic, or any suitable material. The cabinet illustrated is a portable model having a carrying handle 3 on its top, but it will be understood that the invention may be used with any style of cabinet. The operating knobs 4 may be located in any convenient position. The front of the cabinet has an image exhibiting member 5 surrounded by a mask 6.

The mask 6 comprises an inner frame 7 which may be integral with the cabinet walls or may be a separate member. The mask may be made of any suitable material, but preferably is made of the same material as the cabinet. A pair of side light shield panels 8 and 9 and a top light shield panel 10 are hinged to the outer vertical edges and the top of the cabinet, as indicated at 11, 12 and 13, respectively. Each of the panels 8, 9 and 10 has a width equal to the width of the corresponding section of the frame 7. The panels 8, 9 and 10 comprise a three-sided light shield, and each panel may be pivotally moved outwardly to light shielding position by manually grasping it and pulling it outwardly. If desired, these panels may be moved by a rod and gearing, as hereinafter described in connection with the embodiment of FIGS. 19 to 25, or by any suitable motor or mechanical means.

The panels 8, 9 and 10 are of identical structure, and a description of the top panel 10, will suffice for the side panels 8 and 9 as well. The top panel 10, which is hinged to the cabinet at 13, serves as a housing for mechanism, hereinafter described, operable to extend the auxiliary sections 14 and 15 when the panel 10 is pivotally moved to light shielding position. The same mechanism retracts the auxiliary sections when the panel 10 is moved to closed position. A stop member, hereinafter described, is provided to limit the pivotal movement of the panel 10 to 135°. The side panels 8 and 9 are also moved 135° so that the auxiliary sections 16 and 17 will be moved upwardly far enough to abut the ends of the auxiliary sections 14 and 15, respectively, as shown at 18, and to impart a funnel shape to the light shield when the panels 8, 9 and 10 are moved to light shielding position.

The mechanism for operating the auxiliary sections of the embodiment of FIGS. 1 to 5 is best shown in FIGS. 6 to 9. The panel 10 comprises an inner wall 19, an outer wall 20, and an integral edge 21. The edge of inner wall 19 is curled to form integral hinge lugs 22 and 23. The end lugs 22 are the same as the intermediate lug 23 except that the end lugs are each provided with a longitudinal slot 24. Complementary hinge lugs 25 project from a plate 26 which is secured to the adjacent edge of the cabinet 2. The lugs 25 are aligned with the lugs 22 and 23. A hinge pintle 27 extends through the hinge barrel formed by the lugs 23 and 25 to form the hinge 13. The hinge lugs 22 are spaced from the opposite ends of the hinge pintle 27.

Both ends of the panel 10 are alike, and therefore only one end will be described. A rod 28, aligned axially with the hinge pintle 27, passes through the hinge lug 22 and has one end secured within the lug 25 by means of pins 29. The pins 29 prevent rotation of the rod 28 as the panel 10 is moved pivotally about the hinge pintle 27. A helical thread 30 is provided on the rod 28 along its entire length. A flat plate 31 slidably mounted adjacent the inner surface of outer wall 20 has a tubular sleeve 32 rotatably mounted on the rod 28. One end of the sleeve 32 extends into the hinge lug 22, and a pin 33 projecting therefrom extends into the slot 24. The inner surface of the sleeve 32 engages the helical thread 30 to move the plate 31 when the panel 10 is moved about the hinge 13. As viewed in FIGS. 6 and 7, the plate 31 is moved outwardly, or to the left, when the panel 10 is moved upwardly into light shielding position, and inwardly, or to the right, when the section 10 is moved downwardly toward its closed position.

The plate 31 has a longitudinal slot 34 provided with a rack 35 on one of its longitudinal edges. A pinion 36 engaging the rack 35 is mounted on a stud 37 which may be fixed or rotatably mounted in the outer wall 20 of the panel 10. If the stud 37 is fixed, the pinion 36 will be rotatably mounted on the stud. If the stud 37 is rotatably mounted, the pinion 36 will be fixed to the stud. A large pinion 38 is mounted on the stud 37 adjacent the pinion 36. The pinions 36 and 38 may be integral. A strip 39 secured to the auxiliary section 14 adjacent one edge thereof is provided on one edge with a rack 40 engaging the teeth of the pinion 38.

The operation of this embodiment of the invention is very simple. In closed position, each of the panels 8, 9 and 10 is juxtaposed against the frame 7 to give the appearance of a conventional mask surrounding the outer edges of the image exhibiting member 5. In the closed position each of the auxiliary sections is retracted within its panel 8, 9 or 10. When the light shields are to be moved into light shielding position, the panel 10 is lifted upwardly 135° about its hinge 13. The pivotal movement of the panel 10 causes each plate 31 to slide outwardly because of the interengagement between the inner surface of each sleeve 32 and the helical threads 30 on each rod 28. The pins 33 abut the ends of the slots 34 to stop the pivotal movement of the panel 10 when it has moved through 135°.

The sliding movement of the plate 31 causes the racks 35 to rotate the pinions 36 which are in engagement therewith. The pinions 38 are each mounted on the same studs 37 as the pinions 36, and therefore they are also rotated. The racks 40 are in engagement with the pinions 38 and are moved thereby to cause the auxiliary sections 14 and 15 to move outwardly a predetermined distance. It will be understood that the helical threads 30 on each rod 28 extend in opposite directions so that both auxiliary sections 14 and 15 move outwardly or inwardly simultaneously.

After the panel 10 has been moved to light shielding position, the panels 8 and 9 are pivotally moved outwardly 135°. The auxiliary sections 16 and 17 at the upper end of panels 8 and 9, respectively, are moved upwardly in the same manner the auxiliary sections 14 and 15 are moved outwardly. The outward pivotal movement of each panel 8 and 9 is stopped in the same manner as the upward pivotal movement of the panel 10, and the edges of the auxiliary sections 16 and 17 abut the edges of the auxiliary sections 14 and 15, respectively, to form a closed corner for the light shield which is adapted to prevent external light from passing through either upper corner of the light shield.

Referring to FIGS. 10 to 18, a cabinet 41 is provided with an image exhibiting member 42 surrounded by a mask 43. A top light shield panel 44 is pivotally secured to the front of the cabinet by a hinge 45. Two side light shield panels 46 are similarly secured to the cabinet by hinges 47. The panels 44 and 46 are of equal width, and in closed position each panel fits into a recess 48 provided for it in the outer surface of the cabinet. The cabinet walls are each preferably provided with a finger notch 49 to facilitate movement of the panels to light shielding position. The operating knobs 50 are positioned on the side of the cabinet beyond the edge of the side panel 46.

In this embodiment, each of the side panels is manually moved forwardly about its hinge 47 into its light shielding position. The light shielding position is about 45° forwardly of the vertical plane of the image exhibiting member so that the panels will not restrict the useful angle of vision for viewing the screen. Each side panel has an auxiliary section 51 which moves upwardly as the panel is moved forwardly about its pivot. The upper edge of each auxiliary section is provided with a thin strip 52 of felt or rubber. The top light shield panel 44 is then moved upwardly and forwardly about its hinge 45. The top light shield has two auxiliary sections 53 which move outwardly as the top panel is moved forwardly about its pivot. The outer edges of the auxiliary sections 53 engage the felt strips 52 on the upper edges of the auxiliary sections 51 to provide an effective seal against the passage of light at each upper corner.

The mechanism for automatically moving the auxiliary sections of the embodiment of FIGS. 10 to 18 is shown in FIGS. 14 to 18. In this embodiment the auxiliary sections are moved pivotally instead of slidingly, as in the embodiment of the invention shown in FIGS. 1 to 9. The mechanism for moving the auxiliary sections is the same for each panel except that the top panel has one mechanism at each end, while each of the side panels has a mechanism only at its upper end. The description will be limited to the structure at one end of the top panel, but it will be understood to apply to the other end of the top panel and to the upper end of each side panel as well. Although the light shield panels are manually moved, they may be moved by a crank or a motor.

Referring to FIGS. 14 to 18, the panel comprises a top wall 54, a bottom wall 55 and an integral edge 56 which serve as a housing for the auxiliary section and the mechanism for moving it. The edge of panel 44 opposite the edge 56 is provided with integral hinge lugs 57 and 58 which are aligned with hinge lugs 59 projecting from a hinge plate 60 secured in a recess 61 below the panel 44. A hinge pintle 62 extends through the hinge lugs 57, 58 and 59 and is fixed to the hinge lug 59 by a pair of pins 63. The hinge lugs 57 and 58 rotate about the hinge pintle 62 when the panel 44 is moved about the hinge 45. A pin 64 projects from the hinge lug 58 and abuts the front of the cabinet when the panel 44 is moved pivotally forward about 135° from its closed position to stop the panel in its light shielding position.

The portion of the hinge pintle 62 passing through the hinge lug 58 is reduced in diameter, as indicated at 65, to permit a sleeve 66 to encircle the reduced portion 65 and fit within the hinge lug 58. The sleeve 66, which rotates with the hinge lug 58, is provided with a helical slot 67. A pin 68 rigidly secured to the reduced portion 65 of the hinge pintle 62 projects into the helical slot 67. Since the hinge pintle 62 remains stationary as the panel 44 is moved about the hinge 45, the sleeve 66 is moved axially by the engagement of the pin 68 with the slot 67. The direction of the movement of the sleeve 66 is outwardly, or to the left, as viewed in FIGS. 14 and 15, when the panel 44 is moved forwardly about the hinge 45 to bring it into light shielding position. The sleeve 66 is moved in the opposite direction when the panel is moved rearwardly about the hinge toward its closed position.

A rack 69, which is either integral with, or rigidly secured to, the sleeve 66, is provided with teeth 70 on the edge closest to the hinge 45. The auxiliary section 53 is positioned between the rack 69 and the wall 55 of panel 44. The auxiliary section 53 is shaped like a right angled triangle with the side adjacent the hinge 45 recessed along a substantial portion of its length, as indicated at 71, to provide clearance for the hinge structure. The unrecessed portion of the auxiliary section 53 adjacent the hinge 45 is pivotally secured within the panel 44 by a bearing pin 72. The pin 72 passes through the panel 44 and has its ends rotatably mounted in apertures provided therefor in the walls 54 and 55 of the panel 44. A pinion 73 fixed to the bearing pin 72 is rigidly secured to the auxiliary sections 53 so that the auxiliary section will rotate with the pinion.

The teeth 74 of the pinion 73 are meshed with the teeth 70 of the rack 69 so that longitudinal movement of the rack will rotate the pinion and swing the auxiliary section 53 pivotally about the pin 72. When the panel 44 has been moved to its light shielding position the recessed edge portion of the auxiliary section 53 overlaps the adjacent edge of the panel 44. The angular edge 75 of the auxiliary section 53 abuts the angular edge of the auxiliary section 51 when the side panel 46 and the top panel 44 are both in their light shielding position.

The embodiment of FIGS. 19 to 25 comprises a cabinet 76 having an image exhibiting member 77 surrounded by a mask 78 which opens up into a four-sided light shield. Operating knobs 79 and a knob 80 for manipulating the light shield mechanism, hereinafter described, project from one side of the cabinet. The mask extends angularly inward from the front wall 81 of the cabinet. The surface 82 of the mask, which is exposed when the mask is closed, is comparatively dark. The outer surface of the mask is considerably less bright than the surface of the image exhibiting member when the television set is in operation.

The mask 78, which extends angularly inwardly from the front 83 of the cabinet 76, comprises an inner frame 84 and a plurality of panels 85 each hinged to an outer edge of the frame 84, as indicated at 86. The surface 82 of the mask is the outer surface of the panels 85. The inner surface 87 of each panel 85, and the surface of the frame 84, which is exposed when the panels 85 are moved to light shielding position, each have a higher diffuse reflection factor than the surface 82. If the cabinet has a dark mask, the surface 82 may have a diffuse reflection factor of 15%. The surface 87 and the frame 84 are generally white or light cream in color, and may have a diffuse reflection factor of 80%. In a level of illumination of twenty foot-candles, surface 82 has a brightness of three foot-lamberts and the surface 87 has a brightness of sixteen foot-lamberts when open into light shielding position. The difference in the brightness of the mask and the image exhibiting member when the mask is in closed position will cause considerable eye strain, but the image exhibiting member may be viewed for a considerable length of time without appreciable eye strain when the mask is open in light shielding position.

Figure 25:
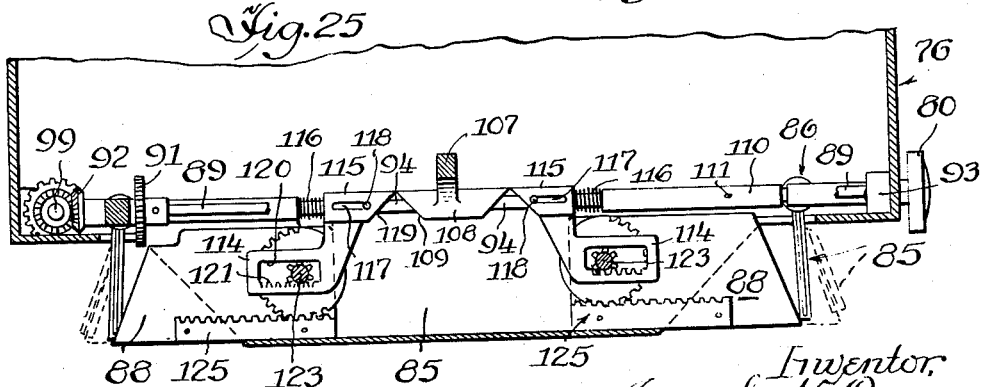
FIG. 25 is a cross sectional view, taken along the line 25—25 of FIG. 24.

The mechanism for operating each of the light shield panels in this embodiment of the invention is essentially the same, and the description of identical structure will not be duplicated. This mechanism is shown in FIGS. 24 and 25.

The knob 80 is fixed to the end of a rod 89 extending across the top of the cabinet 76 behind the front wall 81 and having its other end rotatably supported in a bracket 90 secured to the top wall of the cabinet adjacent one corner. A gear 91 is fixed to the rod 89 adjacent the bracket 90 and a beveled gear 92 is fixed to the end portion of the rod 89. A bracket 93 is secured to the cabinet 76, adjacent each of the other three corners inside the front wall 81.

In the embodiment of the invention shown in FIGS. 19 to 25, all four panels are simultaneously moved toward open, or light shielding position, by rotation of the knob 80 in one direction. Rotation of the knob 80 in the opposite direction moves the panels simultaneously toward closed position. Although the knob 80 is manually rotated, it should be understood that the knob may be replaced by any suitable motor. It is also possible to provide a slight lag in the movement of one pair of oppositely disposed panels relative to the other, if desired.

Each panel 85 is provided with an auxiliary section 88 adjacent each end thereof. The auxiliary sections 88 are automatically extended toward the light shielding position when the panels 85 are moved toward light shielding position, and are automatically retracted into the mask when the panels 85 are moved toward closed position.

The hinges 86 comprise hinge pintles 94, 95, 96 and 97 respectively positioned adjacent the top, bottom and each side of the cabinet just rearwardly of the front wall 81. The hinge pintles 94 and 95 each extend substantially across the width of the cabinet, and the hinge pintles 96 and 97 each extend substantially across the height of the cabinet. The pintles 94 and 96 each have one end rotatably mounted in the bracket 90 and the other end rotatably mounted in one of the brackets 93. The pintles 95 and 97 each have both ends rotatably mounted in two adjacent brackets 93.

The pintle 94 has a gear 98 meshed with the gear 91 so that the pintle 94 is rotated by the rotation of the rod 89. The gear 98 is smaller than the gear 91 so that the knob 80 does not have to be turned very much to rotate the pintle 94 the distance required to move the panel 85 between its light shielding position and its closed position. The beveled gear 92 meshes with a complementary beveled gear 99 mounted on a shaft 100 which is supported by the bracket 90. The shaft 100 has a gear 101 mounted thereon and meshed with a gear 102 mounted on the hinge pintle 96. The opposite end of the pintle 96 has a beveled gear 103 meshed with a complementary beveled gear 104 on the end of hinge pintle 95. The other end of the pintle 95 has a beveled gear 106 on the pintle 97. The intermeshed gears cause each of the hinge pintles 94, 95, 96 and 97 to be rotated simultaneously by the rotation of the rod 89.

The pivotal movement of each panel 85 is the same, and therefore the mechanism for moving the panels will be described with reference to a single panel, it being understood that the description applies to each of the four panels.

The pintle 94 is centrally supported by a bracket 107 fixed to the wall of the cabinet and having its inner end curled into tubular form, as indicated at 108, to enclose the center portion of the pintle. The ends of the tubular extension 108 are angular, as indicated at 109, for a reason hereinafter disclosed. The panel 85 has a pair of integral hinge lugs 110 through which the pintle 94 extends. The pintle 94 is free to rotate in the tubular extension 108, but is pinned to hinge lugs 110, as indicated at 111, so that the panel 85 moves pivotally with the rotation of the pintle 94.

The panel 85 is formed of two parallel walls 112 and 113 spaced to form a housing for the auxiliary sections 88 and the mechanism for moving them into and out of light shielding position. A plate 114 positioned between the auxiliary section 88 and the wall 113 has a tubular sleeve 115 encircling the pintle 94 between the hinge lug 110 and the tubular extension 108 of the bracket 107. A compression spring 116 is coiled around the pintle 94 between the hinge lug 110 and the sleeve 115 to urge the sleeve 115 toward the tubular extension 108. The sleeve 115 has a longitudinal slot 117, and the pintle 94 has a pin 118 projecting therefrom into the slot 116.

The plate 114 is sandwiched between the walls 112 and 113 of panel 85 and moves pivotally with the panel. The end of the sleeve 115 adjacent the end 109 of the tubular extension 108 is angular, as indicated at 119, and abuts against the angular end 109 of the extension 108 when the panel 85 is in closed position. As the panel 85 is moved pivotally from its closed position to its light shielding position, the sleeve 115 moves pivotally relative to the tubular extension 108. As the sleeve 115 is pivotally moved around the pintle 94, the abutment of the angular ends 109 and 119 causes the sleeve 115 to be moved outwardly, or to the left, as viewed in FIG. 24, against the action of the spring 116.

The plate 114 has a longitudinal slot 120 provided with a rack 121 along one longitudinal edge. A pinion 122 engaging the rack 121 is mounted on a stud 123 which is mounted in the panel 85, similar to the mounting of the stud 37 in the panel 10. A larger pinion 124 is also mounted on the stud 123 and engages a rack 125 secured to the auxiliary section 88. As the sleeve 115 is forced outwardly by its engagement with the angular end 109 of the tubular extension 108, the rack 121 rotates the pinion 122. The stud 123 and the pinion 124 are rotated by the pinion 122, and the engagement of the pinion 124 with the rack 125 moves the auxiliary section 88 outwardly until the pin 118 strikes the end of the slot 117.

Although I have described a few preferred embodiments of my invention in considerable detail, it will be understood that the description thereof is intended to be illustrative, rather than restrictive, as many details may be modified or changed without departing from the spirit or scope of my invention. Accordingly, I do not desire to be restricted to the exact structure described, except as limited by the appended claims.

I claim:

1. A cabinet having a front opening, an image exhibiting member exposed through said opening, a light shield panel hingedly mounted adjacent said image exhibiting member, a pinion rotatably mounted in said panel, an auxiliary light shield section fixed to said pinion, said panel being pivotally movable into and out of light shielding position, and means responsive to the pivotal movement of said panel to rotate said pinion and thereby move said auxiliary light shield section pivotally into and out of light shielding position upon pivotal movement of said panel.

2. A cabinet having a front opening, an image exhibiting member exposed through said opening, hinges secured to said cabinet adjacent each edge of said image exhibiting member, a light shield panel mounted on each of said hinges, a pair of auxiliary sections secured to each of said panels, means for pivotally moving each of said panels into and out of light shielding position, and means operatively connected to the respective hinges for moving each pair of auxiliary sections into and out of light shielding position upon pivotal movement of the panel to which they are secured, each of said auxiliary sections abutting an auxiliary section of an adjacent panel to form a continuous light shield around the edges of said image exhibiting member when all of said panels are in light shielding position, the surfaces of said panels and auxiliary sections exposed in light shielding position having a higher diffuse reflection factor than the surfaces of said panels exposed when said panels are in closed position.

3. A cabinet having an image exhibiting member, a mask framing the edges of said image exhibiting member, said mask comprising a fixed frame and a plurality of panels hinged to said frame, each of said panels being movable between a closed and an open position, said panels serving as a light shield for said image exhibiting member when in open position, an auxiliary section positioned within to each of said panels, said auxiliary section being mechanically interconnected to its panel whereby it is automatically moved laterally in the plane of its panel to increase the area of its panel when said panel is moved into open position.

4. A cabinet having a front opening, an image exhibiting member exposed through said opening, a mask framing said opening adjacent the edges of said image exhibiting member, said mask comprising a frame fixed to said cabinet and a plurality of panels hinged to said fixed frame, said hinged panels being pivotally movable into open or closed position, said hinged panels serving as a mask when in closed position, and serving as a light shield when in open position, an auxiliary section movably secured to each of said panels, and means to move each of said auxiliary sections into light shielding position automatically upon movement of the panel to which it is secured into light shielding position.

5. A cabinet having a front opening, an image exhibiting member exposed through said opening, a mask framing said opening adjacent the edges of said image exhibiting member, said mask comprising a frame fixed to said cabinet and a plurality of panels hinged to said fixed frame, said hinged panels being pivotally movable into open or closed position, said hinged panels serving as a mask when in closed position, and serving as a light shield when in open position, an auxiliary section slidably mounted in each of said panels, and means to slide each of said auxiliary sections into or out of light shielding position automatically upon pivotal movement of the panel to which it is secured into or out of light shielding position.

6. A cabinet having a front opening, an image exhibiting member exposed through said opening, a mask framing said opening adjacent the edges of said image exhibiting member, said mask comprising a frame fixed to said cabinet and a plurality of panels, hinges pivotally securing each of said panels to said fixed frame, said hinged panels being pivotally movable into open or closed position, said hinged panels serving as a mask when in closed position, and serving as a light shield when in open position, an auxiliary section pivotally secured to each of said panels, and means operatively connected to said hinges to move each of said auxiliary sections in the plane of the panel to which it is secured as said panel is moved pivotally, said auxiliary sections being moved outwardly into light shielding position as said panels are moved into light shielding position and being retracted into said mask as said panels are moved into closed position.

7. A cabinet having a front opening, an image exhibiting member exposed through said opening, a mask framing said opening adjacent the edges of said image exhibiting member, said mask comprising a frame fixed to said cabinet and a plurality of panels hinged to said fixed frame, said hinged panels being pivotally movable into open or closed position, said hinged panels serving as a mask when in closed position, and serving as a light shield when in open position, a pair of auxiliary sections secured to each of said panels, and means for simultaneously moving all of said panels and auxiliary sections into light shielding position or into closed position, said auxiliary sections being concealed within said mask in closed position, the surfaces of said panels and auxiliary sections exposed when in light shielding position having a higher diffuse reflection factor than the surfaces of said panels exposed when said panels are in closed position.

8. A cabinet having a front wall having an opening therein, an image exhibiting member exposed through said opening, a plurality of hinges secured to said cabinet adjacent said image exhibiting member, a plurality of light shield panels mounted on said hinges, said hinges permitting movement of said panels between a retracted position and a light shielding position relative to said image exhibiting member, each of said panels being disposed at an angle obtuse to the plane of said front wall when in its light shielding position, and means operatively connected to the respective hinges for expanding the planar area of each of said panels as it is moved into light shielding position.

9. A cabinet having a front wall having an opening therein, an image exhibiting member exposed through said opening, a plurality of hinges secured to said cabinet adjacent edges of said opening, a plurality of light shield panels mounted on said hinges, said hinges permitting pivotal movement of each of said panels between a retracted position and a light shielding position extending forwardly of said front wall at an angle obtuse to the plane of said front wall, an auxiliary light shield section secured to each of said panels, and means operatively connected to the respective hinges for moving each of auxiliary light shield sections outwardly in the plane of the panel to which it is secured as said panel is moved into light shielding position.

10. A cabinet having a front wall having an opening therein, an image exhibiting member exposed through said opening, a plurality of hinges secured to said cabinet adjacent edges of said openings, a top panel and a pair of side panels mounted on said hinges, each of said panels comprising a shallow housing, an auxiliary light shielding section mounted in each of said panels, said hinges permitting each of said panels to be moved pivotally about an axis parallel to the adjacent edge of the image exhibiting member from a retracted position into light shielding position forwardly of said front wall in a plane extending at an obtuse angle to the plane of said front wall, and means connected to said hinges and movable by the pivotal movement of said panels between said retracted position and said light shielding position to automatically project each of said auxiliary sections out of its panel in the plane of said panel when the panels are moved into light shielding position, and to automatically retract each of said auxiliary sections into its panel when said panels are moved into said retracted position.

11. A cabinet having a front wall having an opening therein, an image exhibiting member exposed through said opening, a plurality of hinges secured to said cabinet adjacent edges of said opening, a top panel and a pair of side panels, an auxiliary light shielding section slidably secured to each of said panels, said hinges permitting each of said panels to be moved into and out of light shielding position, each of said panels being disposed in a plane extending at an obtuse angle to the plane of said front wall when in light shielding position, and means for automatically sliding each of said auxiliary sections into light shielding position in the plane of its panel upon movement of said panels into light shielding position.

12. A cabinet having a front wall having an opening therein, an image exhibiting member exposed through said opening, a panel mounted adjacent each edge of said image exhibiting member, hinges connecting each of said panels to said front wall, an auxiliary section slidably secured to each of said panels, means for simultaneously moving each of said panels pivotally into and out of light shielding position, each of said panels being disposed in a plane extending at an obtuse angle to the plane of said front wall when in light shielding position, and means for simultaneously sliding each of said auxiliary sections into and out of light shielding position in the plane of its panels upon pivotal movement of said panels into and out of light shielding position.

13. A cabinet having a front wall having an opening therein, an image exhibiting member exposed through said opening, a top panel and a pair of side panels, hinges secured to said cabinet adjacent said image exhibiting member, said hinges connecting said panels to said front wall, an auxiliary section pivotally secured to each of said panels, said hinges permitting pivotal movement of each of said panels about an axis parallel to the adjacent edge of the image exhibiting member into and out of light shielding position, each of said panels being disposed in a plane extending at an obtuse angle to the plane of said front wall when in light shielding position, and means for pivotally moving each of said auxiliary sections automatically into and out of light shielding position in the plane of its panel upon movement of said panels into and out of light shielding position.

14. A cabinet having a front wall having an opening therein, an image exhibiting member exposed through said opening, a hinge secured to said cabinet adjacent one edge of said opening, a light shield panel mounted on said hinge, means for moving said panel into and out of light shielding position, and means coplanar with said panel in all positions thereof for increasing its surface area as it is moved toward light shielding position, said panel exposing one surface when it is in light shielding position and exposing its opposite surface when it is out of light shielding position, said one surface of said panel having a higher diffuse reflection factor than said opposite surface.

15. A cabinet having a front wall, top wall and side walls, said front wall having an opening therein, an image exhibiting member exposed through said opening, a hinge secured to said front wall adjacent each of said other walls, and a plurality of panels constituting portions of said top wall and side walls adjacent said front wall, said panels each being mounted on one of said hinges, said hinges permitting pivotal movement of said panels between a retracted position rearwardly of said front wall and an open position in which they project forwardly of said front wall and serve as light shields for said image exhibiting member.

16. A cabinet having a front wall having an opening therein, an image exhibiting member exposed through said opening, a plurality of hinges secured to said cabinet adjacent edges of said opening, panels mounted on said hinges, said panels being movable between a retracted position and an open position in which they project forwardly of said opening at an obtuse angle to the plane of said front wall and serve as light shields for said image exhibiting member, an auxiliary section connected to each of said panels, and means moving each of said auxiliary sections into light shielding position in the plane of its panel automatically upon movement of said panels into light shielding position.

17. A cabinet having a front wall having an opening therein, an image exhibiting member exposed through said opening, a plurality of hinges secured to said cabinet adjacent edges of said opening, panels mounted on said hinges, said panels being movable between a retracted position and an open position in which they project forwardly of said opening at an obtuse angle to the plane of said front wall and serve as light shields for said image exhibiting member, an auxiliary section connected to each of said panels, and means moving each of said auxiliary sections into light shielding position automatically upon movement of said panels into light shielding position, the outer edges of each auxiliary section engaging the outer edge of the auxiliary section of an adjacent panel to provide a continuous light shield around adjacent edges of said image exhibiting member.

18. A cabinet having a front wall having an opening therein, an image exhibiting member exposed through said opening, a plurality of hinges secured to said cabinet adjacent edges of said opening, panels mounted on said hinges, said panels being movable between a retracted position and an open position in which they project forwardly of said opening at an obtuse angle to the plane of said front wall and serve as light shields for said image exhibiting member, an auxiliary section secured to each of said panels, and means operatively connected to the hinge of each panel for moving the auxiliary section secured to said panel into light shielding position in the plane of said panel automatically upon movement of said panel into light shielding position.

19. A cabinet having a front wall having an opening therein, an image exhibiting member exposed through said opening, a plurality of hinges secured to said cabinet adjacent edges of said opening, panels mounted on said hinges, said panels being movable between a retracted position and an open position in which they project forwardly of said opening at an obtuse angle to the plane of said front wall and serve as light shields for said image exhibiting member, an auxiliary section movably secured to each of said panels, and means operatively connected to each hinge for moving the auxiliary sections of each panel into light shielding position in the plane of said panel automatically upon movement of said panels into light shielding position, the outer edge of each auxiliary section engaging the outer edge of the auxiliary section of an adjacent panel to provide a continuous light shield around adjacent edges of said image exhibiting member.

20. A cabinet having a front wall having an opening therein, an image exhibiting member exposed through said opening, a hinge secured to said cabinet adjacent one edge of said opening, a light shield panel mounted on said hinge, an auxiliary light shielding section slidably secured to said light shield panel, said hinge permitting said light shield panel to be moved into and out of light shielding position, said panel being disposed in a plane extending at an angle obtuse to the plane of said front wall when in light shielding position, and means for automatically sliding said auxiliary section into light shielding position in the plane of its panel upon movement of said panel into light shielding position.

21. A cabinet having a front wall having an opening therein, an image exhibiting member exposed through said opening, a panel movably mounted adjacent an edge of said image exhibiting member, said panel being movable between a retracted position rearwardly of said front wall and a light shielding position, said panel in light shielding position extending at an angle obtuse to the plane of the front wall of said cabinet to increase the angle of vision relative to said image exhibiting member, the surface of said panel exposed when the panel is in light shielding position having a higher diffuse reflection factor than the surface of said cabinet that is concealed by said panel in its light shielding position.

22. A cabinet having a front wall having an opening therein, an image exhibiting member exposed through said opening, a panel movably mounted adjacent an edge of said image exhibiting member, said panel being movable between a retracted position rearwardly of said front wall and a light shielding position, said panel in light shielding position extending at an angle obtuse to the plane of the front wall of said cabinet to increase the angle of vision relative to said image exhibiting member, the surface of said panel exposed when the panel is in light shielding position having a higher diffuse reflection factor than the surface of said cabinet that is concealed by said panel in its light shielding position, and means for expanding the surface area of said panel in its own plane in light shielding position.

References Cited in the file of this patent

UNITED STATES PATENTS

| | | |
|---|---|---|
| 2,150,992 | Scott | Mar. 21, 1939 |
| 2,265,859 | Rinaldy | Dec. 9, 1941 |
| 2,431,830 | Rose | Dec. 2, 1947 |
| 2,474,055 | Lacey | June 21, 1949 |
| 2,598,072 | Rose | Mar. 27, 1952 |
| 2,627,067 | Rose | Jan. 27, 1953 |
| 2,751,583 | Jones | June 19, 1956 |
| 2,759,178 | Rose | Aug. 14, 1956 |

FOREIGN PATENTS

| | | |
|---|---|---|
| 532,528 | France | Feb. 6, 1922 |
| 510,084 | Great Britain | July 24, 1939 |
| 496,758 | Canada | Oct. 13, 1953 |